INVENTOR
William F. Sands
BY H. G. Grover
ATTORNEY

FREQUENCY MODULATION RECEIVER

Filed April 30, 1946 3 Sheets-Sheet 2

INVENTOR
William F. Sands
BY H. G. Grover
ATTORNEY

FREQUENCY MODULATION RECEIVER

Filed April 30, 1946 3 Sheets-Sheet 3

INVENTOR
William F. Sands
BY H. S. Grover
ATTORNEY

Patented Jan. 30, 1951 2,539,637

UNITED STATES PATENT OFFICE 2,539,637

FREQUENCY MODULATION RECEIVER

William F. Sands, Haddonfield, N. J., assignor to Radio Corporation of America, a corporation of Delaware Application April 30, 1946, Serial No. 665,934

6 Claims. (Cl. 250—20)

My present invention relates generally to improved angle modulated carrier wave receivers, and more particularly to novel methods of, and means for, reduction of the deleterious effects of multi-path transmission in frequency modulation (FM) receivers.

In angle modulated carrier wave reception, such as FM signal wave reception, there is often encountered severe amplitude distortion of the audio frequency output of the receiver which is attributable to the phenomenon termed "multi-path transmission." Briefly, multi-path transmission signifies the unavoidable transmission of the signal waves over more than one path from the FM transmitter. An FM receiver collects such FM waves, transmitted over a plurality of paths, in phase and/or amplitude displacement. Regardless of the factors causing the multi-path transmission, the fact is that its occurrence gives rise to severe distortion in the audio output of the receiver.

Hence, it is an important object of my present invention to provide novel methods of, and means for, reducing such amplitude distortion in the audio output of the receiver despite the existence of the multi-path transmission effect.

It is important not to disturb the tuning of the station selector circuits prior to the FM detector, once adjusted to the predetermined center frequency of desired FM signals. This follows from the fact that detuning of the selector circuits results in the reduction of the effective signal-to-noise ratio of the receiver. In addition, in response to detuning, an FM receiver may operate over a curved portion of its selectivity curve thereby producing further amplitude distortion in the receiver output.

Accordingly, it is an important object of my present invention to provide a method of reducing the deleterious effect of multi-path transmission on an FM receiver, wherein the station selector circuits prior to the discriminator input of the FM detector are maintained "in tune," whereas the FM detector characteristic is adjusted in a frequency sense so as greatly to reduce said effect.

Another object of my present invention is to provide an FM receiver whose FM detector is adapted to be "detuned" with respect to the prior selector circuits thereby to decrease the undesirable amplitude distortion which accompanies FM multi-path transmission.

A further object of my invention is to provide a method of shifting the FM detection characteristic of an FM receiver in a frequency sense, while maintaining the remainder of the selector circuits in a predetermined selective condition.

A more specific object of my present invention is to provide an FM receiver including simple and economical means for reducing amplitude distortion created by a common and persistent phenomenon which is practically inherent in the very high frequency ranges of FM communication.

Other objects and advantages of the invention will best be understood by reference to the following description, taken in connection with the drawings, in which I have indicated diagrammatically several circuit organizations whereby my invention may be carried into effect.

Figures 1, 2:
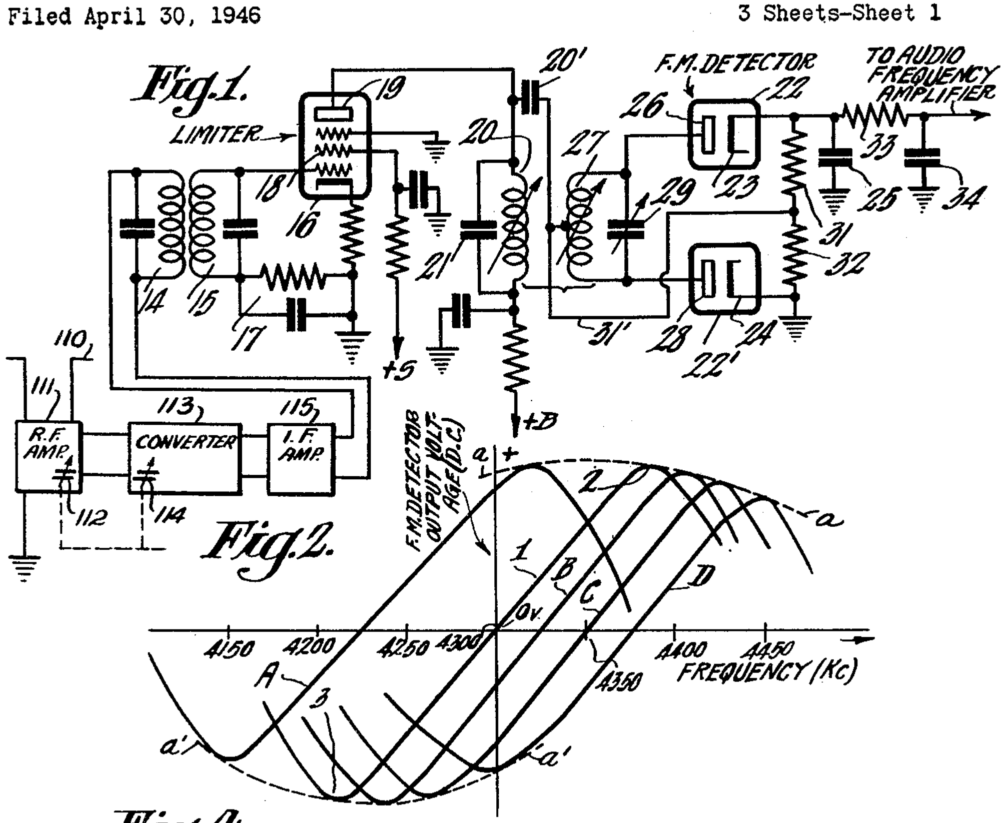
Fig. 1 shows a circuit diagram of the limiter and detector of an FM receiver employing one embodiment of my invention.
Fig. 2 illustrates the effect of adjusting the FM detector characteristic.

Referring now to Fig. 1, there is shown therein the circuit connections of only so much of an FM receiver as is necessary to a proper understanding of the present invention, since those skilled in the art of radio communication are fully aware of the apparatus required. It is well known that in present FM broadcast reception the superheterodyne type of receiver is widely employed. My invention is not restricted to any particular band of FM reception, nor to FM wave reception. The generic term "angle modulated" covers both frequency and phase modulation, as well as hybrid modulations possessing characteristics common to both. The present assigned channel width for each FM station is 200 kc. It is to be understood that the present invention is in no way restricted to any given channel width for each FM station.

Assuming for the purpose of specific illustration that the receiver shown in Fig. 1 is designed to receive FM stations in the present FM band of 42.50 mc. or the proposed 88 to 108 mc. band, the FM waves are collected by any desired type of signal collector device. For example, a dipole 110 may be coupled to the tunable signal selector input circuit of a radio frequency amplifier indicated at 111. The signal selector circuit is usually provided with a tuning reactance, which may be a variable condenser such as shown at 112 or adjustable iron core. The station selector device of any suitable construction is arranged to vary the reactance of the tuning device to a value such as to tune the selector circuit to the mid-band or center frequency of a desired FM station. The amplified radio frequency signal energy, after proper selection, may be selectively amplified in one or more additional stages of radio frequency amplification included within box 111 prior to impression of the FM waves upon the tunable input circuit of a suitable first detector or converter stage 113.

As is well known, the converter 113 is provided with a local oscillator network, either independent of the converter or combined therewith, whose tank circuit is tunable by a variable reactance such as condenser 114 over a range of local oscillator frequencies which differ from frequencies of the signal frequency range by the constant value of the predetermined intermediate frequency (I. F.). The I. F. value may be, for example, 4.3 mc. or higher. The station selector device of the receiver concurrently varies the reactance value of each of variable tuning reactances 112, 114 so that there is produced in the converter resonant output circuit signal energy whose mid-band or center frequency has the I. F. value. The I. F. energy produced at the converter output circuit may be amplified by an I. F. amplifier network 115. The latter may include one or more I. F. amplifier tubes. Numeral 14 indicates the output circuit of the I. F. amplifier 115, while numeral 15 indicates the resonant input circuit of the following amplitude limiter tube 16. It will be understood that each of resonant circuits 14 and 15 is tuned to the operating I. F. value.

The limiter circuit may be of any suitable and well known construction, and includes a resistor-condenser network 17 connected in the low potential side of its input circuit 15 so as to provide grid limiting action on the negative half cycles of the signal waves. The screen grid 18 and plate 19 are respectively operated at a relatively low positive voltage of the order of +75 volts thereby to provide plate limiting on the positive half cycles of the signal input waves. In circuit with the plate 19 there is included a parallel resonant circuit consisting of coil 20 shunted by condenser 21. The circuit 20, 21 is tuned to the operating I. F. value, and constitutes the primary circuit of the FM discriminator input network.

The limiter tube is followed by an FM detector circuit which is generally a discriminator-rectifier circuit of the type disclosed and claimed by S. W. Seeley in his U. S. Patent No. 2,121,103, granted June 21, 1938. It is to be clearly understood, however, that my present invention is in no way limited to the specific form of FM detector circuit shown, since my invention utilized herein will function satisfactorily in conjunction with any other suitable type of FM detector circuit. Before describing the circuit details and functioning of the invention, there will be described the remainder of the FM receiver system and the problem sought to be solved by my present invention.

A pair of opposed diode rectifiers 22, 22′ are shown; they may have their electrodes located in a common tube envelope as in a 6H6 type tube. The cathodes 23 and 24 of the respective diodes are connected by series-arranged load resistors 31 and 32, cathode 24 being directly grounded. The junction of resistors 31 and 32 is connected by lead 31′ to the midpoint of coil 27. The anode 26 of the upper diode is connected to the upper end of the secondary coil 27, while the anode 28 of the lower diode is connected to the lower end of secondary coil 27. The coils 20 and 27 are magnetically coupled, and coil 27 is shunted by the adjustable condenser 29. The secondary circuit 27, 29 is normally resonated to the operating I. F. value, and the high potential side of primary coil 20 is directly connected by condenser 20′ to the midpoint of coil 27.

The arrows through coil 20 and 27 schematically indicate that these coils are adapted to have their inductance values adjustable thereby to provide means for adjusting the frequency of each of the respectivep rimary and secondary circuits of the discriminator network. Such adjusting means may be suitable iron cores. Under present standards of FM broadcast reception, the frequency swing may be up to a maximum of 150 kc., i. e., the deviation on each side of the mean frequency may be up to 75 kc. All of the resonant circuits mentioned herein are designed to respond efficiently to the full swing of the received signal, which may be over the above or other suitable frequency range.

Due to the direct connection from the primary circuit 20, 21 to the midpoint of coil 27, the primary voltage is applied in parallel to each of anodes 26 and 28. Concurrently, the magnetic coupling of the coils 20 and 27 results in the application of the primary circuit voltage to the anodes 26 and 28 in opposed phase relation. However, at each of the anodes 26 and 28 there will exist a quadrature phase relation between each pair of the aforesaid primary voltage components. This quadrature phase relation exists when the I. F. energy at circuit 20, 21 is at the mid-band, or center, frequency of the response curves of circuits 20, 21 and 27, 29. Hence, the resultant voltages at each of anodes 26 and 28 will be equal for the "in-tune" condition, but these resultants will be unequal to an extent and in a direction dependent respectively upon the degree and sense of frequency departure of the I. F. energy at circuit 20, 21 with respect to the center frequency of the response curves of circuits 20, 21 and 27, 29.

These resultant voltages are rectified by each of diodes 26, 23 and 28, 24, and the corresponding rectified voltages are developed across the respective rectifier load resistors 31 and 32. Since the cathode 24 is grounded and the coil 27 provides a direct current connection between resistors 31 and 32, the cathode end of resistor 31 will have an effective, or resultant, rectified voltage which is the differential of the voltages across load resistors 31 and 32. This differential voltage is representative of the modulation signal which was originally applied to the FM carrier at the FM transmitter station. Condenser 25 is an I. F. bypass condenser, and is shunted by resistor 33 and condenser 34 connected in series. The network 25, 33, 34 acts as a filter to prevent all components, save the audio frequency voltages, from reaching the ultimate audio frequency amplifier (not shown). The network 25, 33, 34 may act as a de-ehphasis network, if desired, when phase modulation signals are received.

The FM detection characteristic, which follows the contour of curve 1 in Fig. 2, is well known to those skilled in the art of FM radio communication. It is substantially a characteristic which is provided with a pair of spaced peaks located beyond the limiting frequency swings of the FM waves. The correct tuning psition is at the center, indicated as 4300 kc. (4.3 mc.), of the inclined slope between the spaced peaks 2 and 3. That is, the resonant frequency of the primary and secondary circuits of the discriminator network determines the center of the inclined slope between the spaced peaks of the FM detection characteristic. When the receiver signal selector device is adjusted correctly, the received FM signals produce I. F. energy whose center frequency falls accurately at the desired center frequency value of the FM detection characteristic. Assuming that the receiver station selector has been adjusted to the exact mid-band frequency of a desired FM station, the voltage developed across resistors 31, 32, i. e., the audio frequency output voltage, will have a maximum value for the degree of modulation of the FM waves. This voltage is applied over resistor 33, and is transmitted to one or more following audio frequency amplifier tubes terminated by a suitable reproducer, a loudspeaker for example.

In accordance with my present invention, I provide means for shifting the detection characteristic 1 (as shown in Fig. 2) in the frequency scale. In general, this may be accomplished by a separate control device which may be added to the receiver for specifically detuning the discriminator network from the normal "in-tune" adjustment. It has been found by actual experimentation that merely adjusting the iron core of coil 27, or the magnitude of capacitor 29, is sufficient for shifting the characteristic 1 at least ±75 kc. without excessive change in the shape of the detection characteristic. Accordingly, I have shown in Fig. 2 a family of characteristic curves which represent different degrees of detuning of the discriminator network. Thus, curve A shows the FM detection characteristic shifted −75 kc. with respect to the normal characteristic 1. Curve B shows the characteristic shifted +25 kc., and curves C and D show the respective characteristics when shifted +50 kc. and +75 kc. respectively.

It is seen from Fig. 2 that the various characteristic curves A to D inclusive are all substantially usable. The dotted lines *a*—*a* and *a'*—*a'* are the envelope of the peaks of the various discriminator curves. It will be noted from Fig. 2 that the linearity of the FM detection characteristic is not substantially disturbed despite the detuning of the discriminator network.

Figures 3, 5:
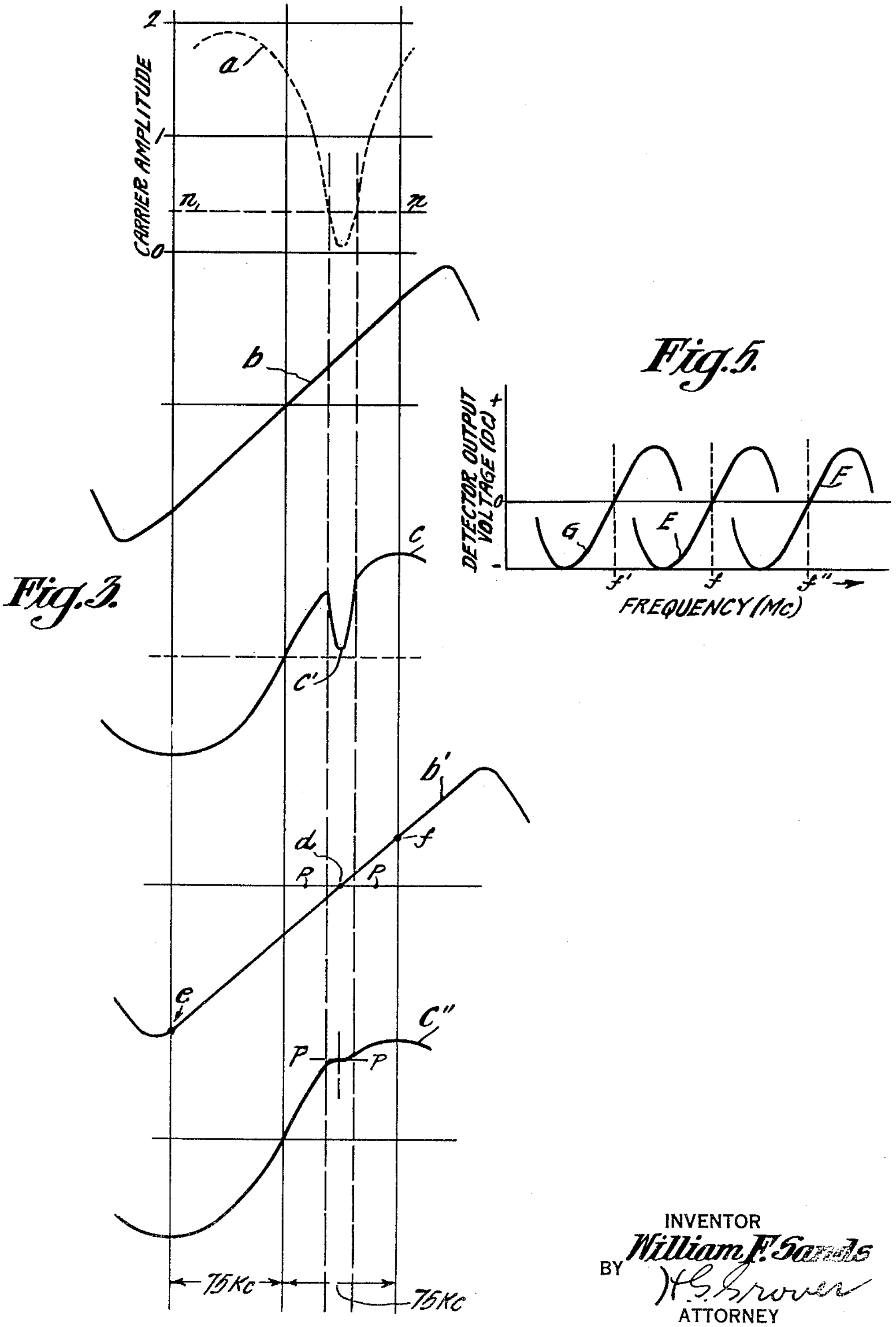
Fig. 3 illustrates the problem sought to be solved, and the method of solving the problem.
Fig. 5 illustrates the function of the adjusting means of Fig. 4.

Reference is now made to Fig. 3 for a theoretical explanation of the functioning of my present invention. I have attempted to portray in Fig. 3 in a purely pictorial manner the underlying cause for the amplitude distortion in the output of the FM receiver during multi-path transmission. Fig. 3, also, shows why shifting the FM detection characteristic in a predetermined sense and to a predetermined degree, causes compensation of the amplitude distortion. It is to be clearly understood that my following explanation of Fig. 3 is presented to explain purely theoretical aspects of my invention, and that the latter is in no way restricted to such theory. The fact is that in actual operation with an FM receiver constructed in accordance with teachings herein, it has been possible to eliminate to a highly marked degree amplitude distortion caused by multi-path transmission.

Multi-path transmission is the transmission over two, or more, paths of a desired carrier wave from a single station, and the eventual reception of the two or more waves at the receiving antenna. In general, the individual waves will have different phases, and will not have the same amplitude. When the two (two only are considered in this application) waves are different in phase by ½ wavelength (i. e. 180°) and have the same amplitude, then complete cancellation occurs. The amount of distortion which may be experienced (in the absence of complete saturation of the limiter) is a function of the path difference traversed; the audio frequency, the maximum frequency deviation; the ratio of the amplitudes of the two received signals; and the relative phase of the two signals at the undeviated frequency. Obviously, if there were no second transmission path, the single received signal would have a voltage vs. frequency curve which was a straight line, parallel to the abscissa, and of unity amplitude. The differing phase between the two received waves causes curve *a*, as the waves are additive over part of the frequency range and cancel over a further frequency region.

Let it be assumed then, that because of multi-path transmission the carrier amplitude vs. frequency characteristic of the transmission path is represented by curve *a* in Fig. 3. The dashed line curve *a* is secured by plotting carrier amplitude variation against carrier frequency. By virtue of the multi-path transmission effect the minimum carrier amplitude corresponds to the frequency at which the received FM signal voltages are 180 degrees out of phase at the receiving antenna. In the illustrative example shown by curve *a*, the minimum carrier amplitude does not occur at the center frequency but at a somewhat higher frequency.

It is, also, assumed that the receiver is equipped with an amplitude limiter, or any other circuit arrangement which performs an analogous function, but due to the insensitivity of the receiver (or the weakness of the received FM signal) the signal is only capable of limiting to the level *n*—*n*. Below curve *a* there is represented the normal detection curve, that is the detection curve 1 of Fig. 2, and it is seen that the detector in that case is operated at the zero balance condition.

Curve *a* of Fig. 3 may be considered to be the voltage received at the antenna terminals (due to the multi-path transmission of a desired signal) vs. frequency. We may consider the voltage vs. frequency curve shown by curve *a* of Fig. 3 to be carried along in the receiver up to the signal input grid of the amplitude limiter tube. Now, due either to the poor sensitivity of the receiver, or to a low signal level at the antenna, the limiter will operate down only to the level shown as *n*—*n* of curve *a*. Thus, by way of illustration, the voltage vs. frequency characteristic at the limiter output could be represented as a horizontal line with a marked dip to the right of center frequency. Now, as shown by curve *b*, the discriminator characteristic is linear over the region of operation. Therefore, the variation in amplitude will be reproduced in the audio output after demodulation of the FM carrier wave by the discriminator. The audio wave form will have spaced dips in successive crests thereof.

The curve *c*, which is drawn as a distorted negative cosine wave, may be used to represent the audio frequency output of the discriminator. Actually, the abscissa for the curve *c* is time rather than frequency, but we are considering that the transmitter deviation is ±75 kc. and show the peak audio value at the peak deviation. The curve is, therefore, satisfactory for a rough graphical analysis. It is seen from curve *c* that for the region of operation below the limiting level n—n, the audio wave is badly distorted. The hole c′ in curve c denotes amplitude distortion in the audio output of the receiver.

Below curve c I have pictured the FM detection characteristic b shifted to a predetermined degree in a positive frequency sense. The curve b′ is representative of the condition when the discriminator network of Fig. 1 has been detuned, say by adjusting the magnitude of capacitor 29, so that the center frequency indicated by d falls at the frequency of maximum cancellation in the amplitude-frequency characteristic curve a. The region of operation of curve b′ is from point e to point f, although the center point of the curve is detuned by point d. Since the center of discriminator curve b′ is at point d a line P—P parallel with the abscissa may be drawn through point d and through the cosine audio curve.

Below the curve b′ there is depicted the curve c in its compensated or corrected condition. Hence, I have designated the lower curve as c″, and it will be noted that the distortion in the wave form cannot exceed the line P—P in the region where the distortion was produced. Accordingly, the resulting curve c″ is greatly improved over the curve c which was secured prior to detuning of the discriminator network.

The line P—P of curve c″ does not cure the distortion, but merely represents the maximum which the audio frequency output may depart from a pure cosine wave form. This is because the new position of "zero balance" of the discriminator, shown by curve b′, is at the frequency of minimum carrier voltage. As a matter of fact, the slight distortion area in curve c″ will generally not be apparent to the ear of the listener. Hence, it will be seen that merely detuning the discriminator network by a simple adjustment device will be sufficient to eliminate the considerable and undesirable amplitude distortion which would otherwise occur in the audio frequency output wave in response to multi-path transmission.

The actual manipulation of the tuning device in the discriminator network will be performed by the listener in response to amplitude distortion becoming evident to him. It is not necessary for the listener to have any expert knowledge of the characteristics of the receiver, nor is it necessary for him to know the precise frequency direction or amount to detune the discriminator network. It will be sufficient, in general, if he adjusts the detuning device to the left or right of the normal adjustment setting, and to an extent such that his ear observes minimum production of amplitude distortion. Such minimum point will of necessity be the point at which the center frequency point d of curve b′ coincides with the frequency of the minimum amplitude point of curve a in Fig. 3. It is stressed that for moderate detuning of the secondary circuit 27, 29, the discriminator curve shape is substantially retained although the center frequency is moved.

Figure 4:
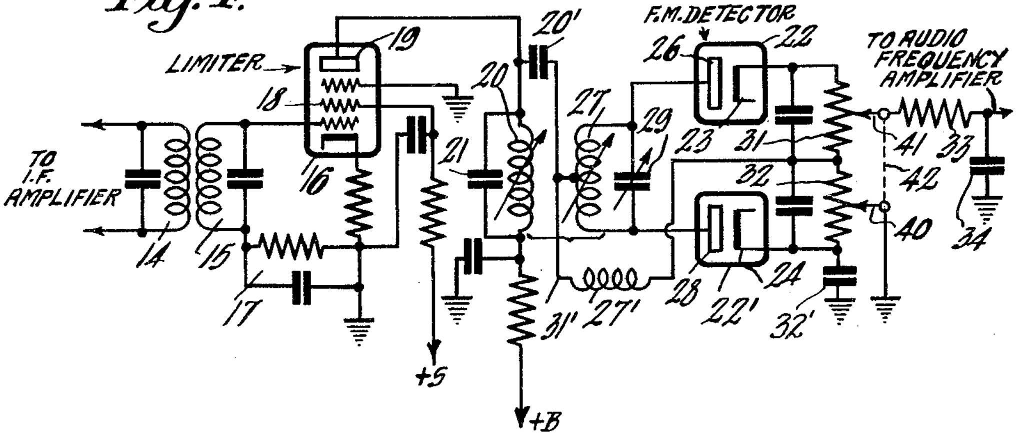
Fig. 4 shows a modification of the circuit.

It is not essential in practicing my present invention to detune the discriminator network. It is possible to provide a frequency shift of the FM detection characteristic by varying the magnitude of the load of the FM detector circuit. Such a modification of the invention is shown in Fig. 4. The circuit is substantially the same as that shown in Fig. 1, except for the modification in the construction of the output loads of the diodes 22 and 22′. The respective load resistors 31 and 32 are respectively bypassed for I. F. currents by individual condensers, and, accordingly, the condenser 25 of Fig. 1 is omitted. The lead 31′ at the junction of resistors 31 and 32 to the midpoint of secondary coil 27 includes a radio frequency choke coil 27′. Furthermore, a radio frequency bypass condenser 32′ connects the cathode end of resistor 32 to ground. A slider 40 is provided for adjustably connecting a predetermined point of resistor 32 to ground. A second slider 41 is provided for the diode load resistor 31, and the dash line 42 denotes any device for mechanically ganging the sliders 40 and 41 so that they may be jointly adjusted. Slider 41 is connected through resistor 33 to the following audio frequency amplifier. By ganging the slider 40 and 41, the magnitudes of the load resistors 32 and 31 are varied concurrently and equally thereby keeping the loading of the diodes substantially constant. It may be noted that the sensitivity of the detector is reduced somewhat. In Fig. 5 I have shown the effect on the FM detection characteristic for various positions of the control device 42. If the curve E represents the normal detection curve whose center frequency is at value f, then curves F and G denote shifting of the characteristic to respectively higher and lower center frequencies f″ and f′.

The curves of Fig. 5 are purely illustrative, since it can be shown that actually the discriminator curve E not only moves on the frequency scale but also slides up and down on the voltage scale. Actually, it would not be entirely necessary to move both sliders, since element 40 could be fixed at the midpoint of resistor 32 and coupling 42 omitted. Only a single slider 41 would then be used. However, the resultant of moving only one slider is that the change in "zero balance point" for a movement of the one slider would not be as rapid as when both resistors 31 and 32 are varied. That is, a single slider would have to be moved approximately twice as far for a given change as when two sliders were employed.

It is to be noted that the diode loads remain substantially constant for any position of the sliders, inasmuch as the sliders do not short out a portion of the resistors on the diode side of the resistors. Of course, in the case using only one slider, the impedance looking into the audio amplifier changes as the slider is moved.

Figure 6:
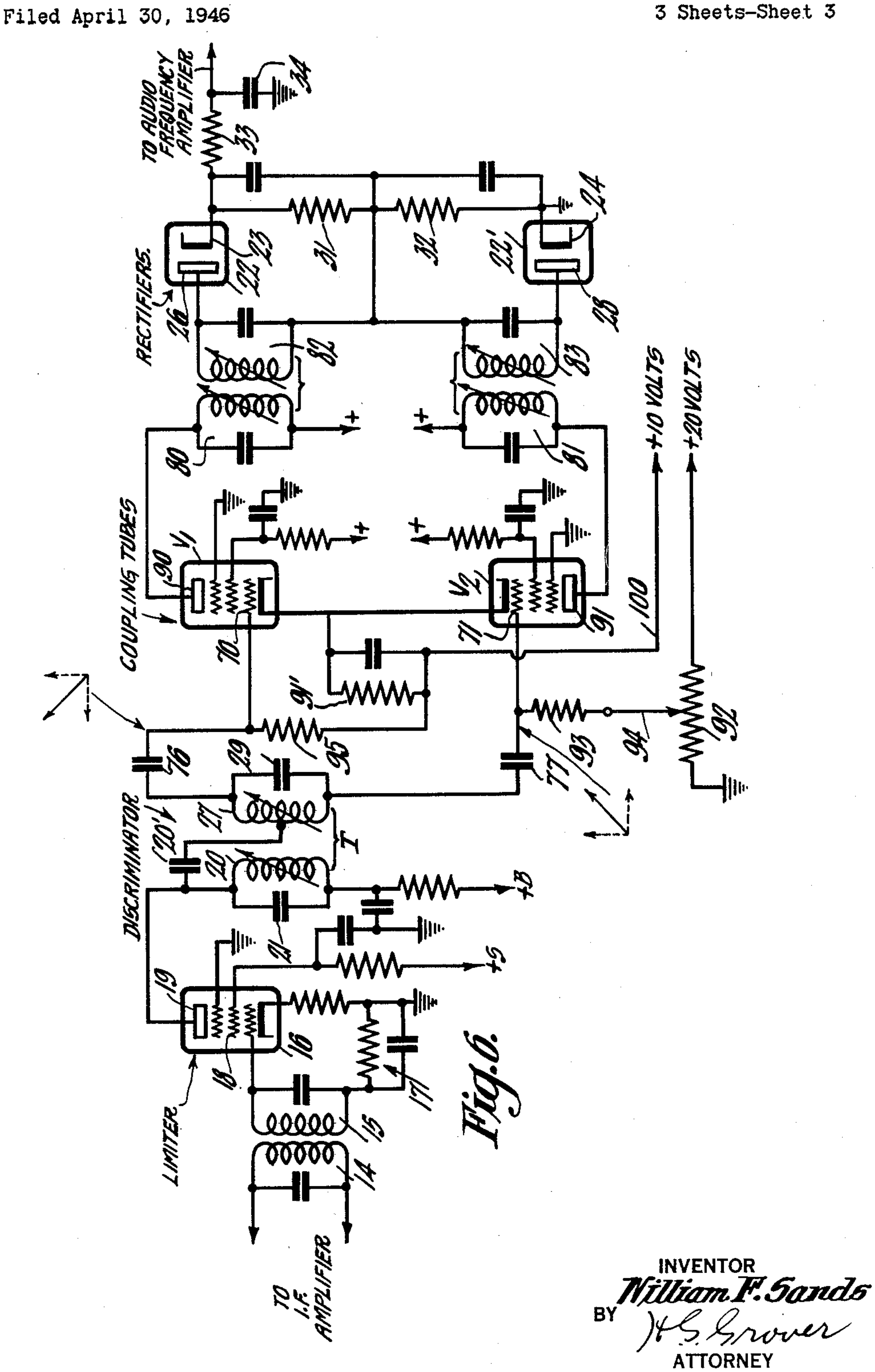
Fig. 6 shows a further circuit modification.

In Fig. 6 I have shown a further modification of the means for adjusting the FM detection characteristic in the frequency scale. In the circuit shown in Fig. 6 the receiver is similar to that shown in Fig. 1 up to, and including, the discriminator secondary circuit 27, 29. The limiter tube 16 has its tuned input network provided with a suitable band pass characteristic such as to pass the entire frequency swing of the received FM signals. The output transformer T has the midpoint of its secondary winding 27 connected directly to the plate end of primary winding 20. Shunt condenser 21 tunes winding 20 to the operating I. F. value. The shunt condenser 29 tunes winding 27 to the same I. F. value. In other words, the resonance curve of magnetically coupled circuits 21, 20 and 27, 29 is that of a band pass curve. Due to the connections between the primary and secondary circuits of transformer T there is provided the frequency discriminatory action disclosed in the aforesaid Seeley patent.

The opposite sides of secondary circuit 27, 29 are connected to the respective signal control grids 70 and 71 of amplifier tubes $V_1$ and $V_2$ by which frequency of balance is adjustable; the method of reducing the undesirable distortion effect which accompanies multi-path transmission of the frequency modulation signals including a maximum cancellation of signals at one frequency within the detector pass band and a corresponding minimum signal amplitude, which includes shifting the zero balance point of the detector characteristic of said detector substantially to the frequency where maximum cancellation of the signal occurs to provide said reduction.

2. A method of reducing the amplitude distortion effect of multi-path transmission of frequency modulated carrier signals causing cancellation of signals at one signal frequency in a frequency modulation receiver having a demodulator whose demodulation characteristic has a balance point of zero output at one frequency within the detector pass band, which frequency of balance is adjustable, which comprises shifting the zero balance point of the detection characteristic substantially to the frequency where maximum cancellation of the signal occurs so as greatly to reduce said effect.

3. In a frequency modulation receiver of the type comprising a selective amplifier followed by a selective detector whose detection characteristic has a balance point of zero output at one frequency within the detector pass band, which frequency of balance is adjustable; the method of reducing the undesirable amplitude distortion effect which accompanies multi-path transmission of the frequency modulation signals and causes signal cancellation at one signal frequency, which includes maintaining the selective amplifier in predetermined selective condition relative to the said signals, and adjusting the frequency of the zero balance point of the detector characteristic of said detector substantially to the frequency where maximum cancellation of the signal occurs to provide said reduction.

4. In a receiver of angle modulated carrier waves of the type comprising a selective detector of such waves whose detection characteristic has a balance point of zero output at one frequency within the detector pass band, which frequency of balance is adjustable, said detector being preceded by a selective transmission network for the waves; the method of substantially reducing the deleterious effects of multi-path transmission of desired angle modulated carrier waves on said receiver including cancellation of the waves at one signal frequency, which includes adjusting the transmission network to select waves of a desired carrier frequency, and adjusting the frequency of the zero balance point of the selective detector characteristic substantially to the frequency where maximum cancellation of said waves due to multi-path transmission occurs to provide said reduction.

5. In a receiver of frequency modulated carrier waves of the type comprising a selective detector of such waves whose detection characteristic has a balance point of zero output at one frequency within the detector pass band, which frequency of balance is adjustable, said detector being preceded by a selective amplifier system for the waves; the method of substantially reducing the deleterious effects of multi-path transmission of desired frequency modulated carrier waves on said receiver including cancellation of the waves at one signal frequency, which includes adjusting the tuning of the amplifier system to select waves of a desired carrier frequency, and adjusting the tuning of the selective detector to shift the zero balance point of the detection characteristic substantially to the frequency where maximum cancellation of said waves due to multi-path transmission occurs to provide said reduction.

6. In a receiver of angle modulated carrier waves of the type comprising a selective balanced detector of such waves preceded by a selective amplifier network for the waves; the method of greatly reducing amplitude distortion effects of multi-path transmission of desired angle modulated carrier waves on said receiver including cancellation of the waves at one signal frequency, which includes the steps of adjusting the amplifier network to select waves of a desired carrier frequency, and effectively adjusting the zero balance point of the selective balanced detector characteristic substantially to the frequency where maximum cancellation of said waves due to multi-path transmission occurs to provide said reduction.

WILLIAM F. SANDS.

REFERENCES CITED

The following references are of record in the file of this patent:

UNITED STATES PATENTS

| Number | Name | Date |
|---|---|---|
| 2,290,517 | Wilson | July 21, 1942 |
| 2,356,224 | Crosby | Aug. 22, 1944 |
| 2,361,625 | Hansell | Oct. 31, 1944 |
| 2,376,125 | Crosby | May 15, 1945 |
| 2,412,482 | Vilkomerson | Dec. 10, 1946 |
| 2,429,788 | Atwood | Oct. 28, 1947 |